May 11, 1926.

P. KRETOWICZ

PROPELLED SLED

Filed Dec. 11, 1925

1,584,232

INVENTOR.
Peter Kretowicz
BY
ATTORNEY

Patented May 11, 1926.

1,584,232

UNITED STATES PATENT OFFICE.

PETER KRETOWICZ, OF CLEVELAND, OHIO.

PROPELLED SLED.

Application filed December 11, 1925. Serial No. 74,715.

This invention relates to sleds, having more particular reference to a sled provided with foot-operated mechanical propelling means.

The invention has for a general object to provide a novel arrangement of propelling devices which may be operated by different movements of the feet of the user.

Other objects relate to the provision of a novel form of reciprocatory propelling element and the means for causing the same to clear the snow or ice on its forward movement.

For further comprehension of the invention, and of the objects and advantages thereof, reference will be had to the following description and accompanying drawings, and to the appended claims in which the various novel features of the invention are more particularly set forth.

Fig. 1 of the drawings is a plan view of a sled having the invention applied thereto.

Figure 1:
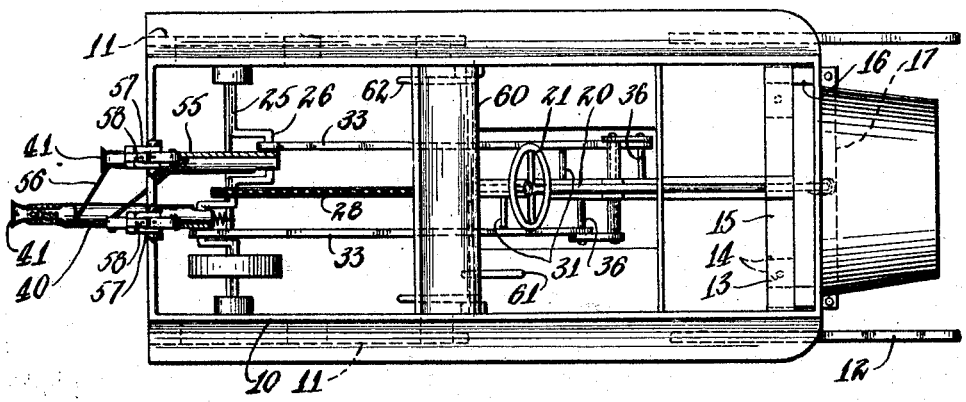
Figure 2:
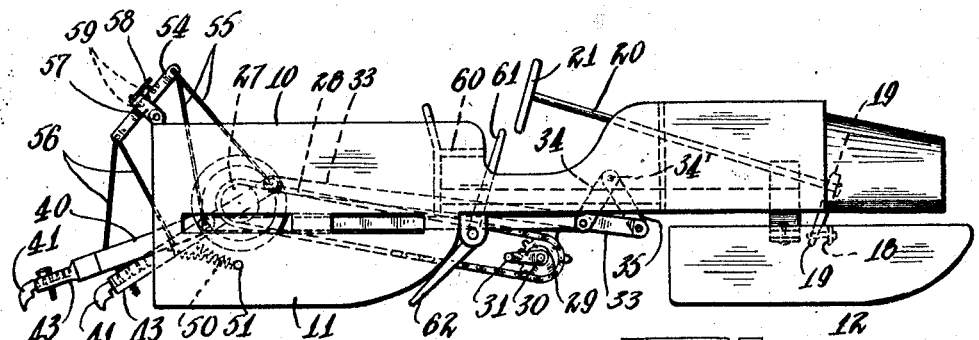
Fig. 2 is a side view thereof.
Figure 4:
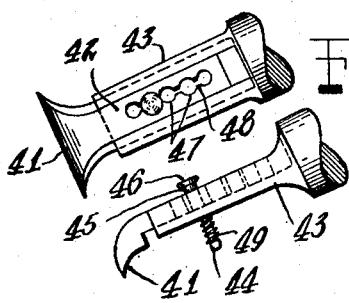
Figs. 4 and 5 are respectively a plan and side view showing the toothed end of the propelling elements or push bars.
Figure 5:
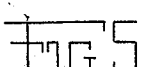
Figure 3:
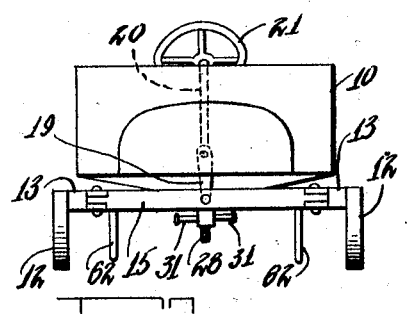
Fig. 3 is a front view.

Referring now to the drawings I provide a box like sled body 10 supported on rear runners 11 and front runners 12, the front runners being movable for steering purposes. These front runners are here shown as having integral ears 13 pivoted as at 14 to an axle member 15 and provided with rigid arms 16 connected by a cross bar 17. The cross bar 17 carries a lug 18 adapted to be engaged by the end of an arm 19 fixed on one end of a steering shaft 20 suitably mounted in the sled body and having a steering wheel 21 on its other end.

For propelling the sled a crank shaft 25 extends across and is suitably supported by the body 10 near the rear end thereof, and is formed with a pair of crank elements 26 which are in diametrically opposed relation to one another. Upon this shaft is fixed a sprocket wheel 27 over which is looped a sprocket chain 28 which extends forwardly and is looped over a second sprocket wheel 29 fixed on a stub shaft 30 carried by a suitable depending element on the sleigh body between the front and rear runners. Upon the stub shaft 30 are fixed a pair of crank pedals 31 for rotation of the same, thus providing one means for rotating the shaft 25.

I also provide a second means for rotating the crank shaft 25 which comprises a pair of connecting rods 33 attached at their rear ends to the crank elements 26 and at their forward ends to the lower ends of a pair of depending arms 34 suitably pivoted at their upper ends as at 34′ to a bracket 35. Upon the forward ends of the rods 33 are pedal members 36, these rods being carried forwardly beyond the sprocket wheels 29 so as to keep the pedal members away from the crank pedals 31.

To the crank elements 26 of shaft 25 are attached a pair of reciprocatory members whereby the sled is propelled, and which I term push bars. These bars are shown at 40 and are pivotally attached at their forward ends to the crank elements 26 in any suitable manner. Upon the rear end of each bar is provided a tooth 41 adapted to engage with the snow or ice this tooth being formed on the end of a dove-tail plate 42 engaged in a complementary guide element 43 fixed to and extending rearwardly from the bar 40. The plate 42 may be adjusted longitudinally in the guide 43 to vary the total length of the push bar, the means for this purpose shown here comprising a transverse pin 44 slidable in a suitable aperture in the guide element 43 and having an enlarged neck 45 and a head 46. Formed in the plate 42 are a series of lonigtudinally spaced apertures 47 connected by a narrow slot 48, the slot 48 being of a diameter to receive the shank of the pin 44 while the apertures 47 correspond in diameter to the enlarged neck 45. A spring 49 holds the neck portion 45 in operative position, the plate 42, being released by pulling the head 46 against the spring until the shank of the pin is registering with the slot 48.

The push-bars 40 are yieldingly pressed downward by coiled tension springs 50 connected at one end thereto at opposite ends to a cross bar 51 extending between the rear runners 11. To raise the rear ends of the push-bars, as the latter move forward, I provide the following means:

To the rear of the sled body, and at the top thereof, are pivoted a pair of walking beams 54 which are alined with the respective crank elements 26. These walking beams have their forward ends connected to their alined crank elements by ropes 55. At their rear ends these walking beams are connected by ropes 56 to the push-bars 40, each walking beam being connected at its rear end, not to the push bar engaging the crank element to which its front end is connected, but to the other push bar so that one crank element serves to lift the rear end of the other bush bar.

To vary the lift given the push bars by the walking beams as desired for varying conditions of the surface on which the sled travels, its pivot point may be shifted on either side of its centre, each beam passing through a corresponding bracket 57 pivoted on the sled body, the bracket carrying a latch member 58 adapted to engage in either one of a series of longitudinally spaced sockets 59 in the beam.

As at 60 I have indicated a seat for the user or driver and adjacent this seat is a brake lever 61 adapted to operate a pair of brake arms 62 which may be swung forward to engage the snow or ice.

In the operation of the device the crank shaft 25 may be rotated either by rotating sprocket wheel 29 by crank pedals 31 or reciprocating the rods 33 by the pedal members 36. As the crank shaft rotates, the push-bars 40 are alternately drawn forward and pushed backward, thus propelling the sled. During the rearward motion of each push-bar the walking beam 54 immediately thereabove is rocked by the rope 55 connected thereto, causing the rear end of the other push-bar, which latter is then moving forward, to be lifted by its rope 56 clear of the snow or ice.

It will be noted that the walking beams are located at a distance to the rear of the crank shaft, while push-bars have a downward and rearward inclination, this arrangement causing the push-bars to be lifted at the beginning of their forward stroke and lowered to operative position at the beginning of their rearward stroke.

Having thus described my invention, what I claim as new and desire to protect by Letters Patent is as follows:

1. In a sled, a crank shaft, a pair of push-bars connected to said crank-shaft to propel the sled, means for rotating said crank shaft, and springs urging said push-bars downward, and means for lifting the rear ends to said push bars as the latter move forward, said means being operable by the said crank shaft, and including a pair of walking beams, ropes connecting said walking beams with the crank elements of the said shaft, and ropes connecting said walking beams with the said push-bars.

2. In a sled, a push-bar, a tooth on the rear of said push bar, a plate with which said tooth is rigid a guide for said plate on the push-bar, said plate having a series of longitudinally spaced apertures connected by a slot, and a shouldered pin adapted to engage in either of said apertures.

3. In a sled, a push-bar, a tooth on the rear of said push bar, a plate with which said tooth is rigid a guide for said plate on the push-bar, said plate having a series of longitudinally spaced apertures connected by a slot, and a shouldered pin adapted to engage in either of said apertures, and a spring surrounding the shank of the pin and holding the shouldered portion thereof in operative position.

In testimony whereof I have affixed my signature.

PETER KRETOWICZ.